United States Patent [19]
May

[11] Patent Number: 5,719,856
[45] Date of Patent: Feb. 17, 1998

[54] TRANSMITTER/RECEIVER INTERFACE APPARATUS AND METHOD FOR A BI-DIRECTIONAL TRANSMISSION PATH

[75] Inventor: Michael R. May, Austin, Tex.

[73] Assignee: Motorola, Inc., Schaumburg, Ill.

[21] Appl. No.: 418,048

[22] Filed: Apr. 7, 1995

[51] Int. Cl.⁶ ................................................. H04B 1/40
[52] U.S. Cl. ................ 370/282; 370/284; 375/220
[58] Field of Search .......................... 370/282, 284, 370/286–291; 375/219, 220

[56] References Cited

U.S. PATENT DOCUMENTS

| | | | |
|---|---|---|---|
| 3,725,582 | 4/1973 | Davis | 370/284 |
| 4,237,463 | 12/1980 | Bjor et al. | 370/284 |
| 5,216,667 | 6/1993 | Chu et al. | 370/284 |
| 5,528,630 | 6/1996 | Ashley et al. | 375/220 |

*Primary Examiner*—Melvin Marcelo

[57] ABSTRACT

A transmitter/receiver interface (12) for use with a bi-directional transmission path (18) couples a transmitter (14) and a receiver (16) to the bi-directional transmission path (18). The transmitter/receiver interface (12) separates transmitted signals (20) and received signals (22) and routes them from the transmitter (14) and to the receiver (16) with negligible interference. The transmitter/receiver interface (12) incorporates coupling elements (44 and 50) that couple the transmitter to the transmission path and incorporates networks that couple the receiver to the transmission path. Impedances of the networks are derived based on the coupling elements and the transfer characteristics of the transmission path to provide consistent attenuation of the transmit signal over a large frequency range.

18 Claims, 7 Drawing Sheets

TRANSMITTER/RECEIVER INTERFACE APPARATUS AND METHOD FOR A BI-DIRECTIONAL TRANSMISSION PATH

TECHNICAL FIELD OF THE INVENTION

This invention relates generally to hybrid circuitry and more particularly to a hybrid circuit which selectively attenuates and passes signals among a transmitter, a receiver, and a bi-directional transmission path.

BACKGROUND OF THE INVENTION

The propagation of signals from one location to another location on a transmission line or transmission path has been known for many years. Historically, the transmission of signals was sequential such that signals would be transmitted from a first end and received on at a second end, and then, responsive signals would be transmitted from the second end and received at the first end. More recently, due to increased signal transmission requirements, signals have been simultaneously transmitted and received on a common transmission path. The simultaneous transmission and receipt of signals upon a common transmission path is often referred to as the duplexing of signals.

One problem relating to the duplexing of signals on a transmission path involves the simultaneous operation of locally coupled transmitter and receiver pairs. A local transmitter couples high energy signals onto the transmission path. A local receiver, on the other hand, receives signals that are remotely coupled to the transmission path but should not receive those signal coupled to the transmission path by the local transmitter. Thus, the local receiver should be electrically isolated from the local transmitter but be fully coupled to the transmission path.

In order to isolate the local receiver from the local transmitter, isolation circuits have been included in line driver circuits to connection between the local transmitter, the local receiver, and the transmission path. Isolation circuits are designed to minimally attenuate remotely generated signals coupled to the transmission path prior to their receipt by the local receiver, to minimally attenuate signals produced by the local transmitter prior to their coupling onto the transmission path, and to greatly attenuate signals generated by the transmitter before their receipt by the receiver. Typically, isolation circuitry should attenuate outgoing signals produced by the local transmitter no more than 6 dB before the signal is coupled to the transmission path, should provide at least 20 dB of isolation between the local transmitter and local receiver, and to attenuate remotely generated signals as little as possible before the signals are received by the local receiver.

One prior isolation circuit incorporated a Whetstone Bridge topology. The Whetstone Bridge implementation included a transformer in one of the bridge legs that provided a tuned response that provided desired isolation and coupling. Because of the transformer, the implementation was expensive and somewhat complex. Additionally, because of the unbalanced nature of the Whetstone Bridge implementation, the circuit could not operate differentially and was therefore susceptible to increased coupled noise. Thus, the prior Whetstone Bridge implementation had shortcomings in both cost and reduced performance.

A prior isolation circuit for differential applications includes a pair of resistors coupling the transmitter to the transformer, where one resistor was coupled to one leg of the transformer and the other resistor to the other leg of the transformer. The values of these resistors are chosen to not provide more than 6 dB of lost transmitter signal strength. To attenuate the transmitted signals from the local receiver, two additional pairs of resistors are added. The first of these pairs are coupled between one of the legs on the transformer and an output of the transmitter, while the other resistor pair is coupled to the other transformer leg and the other output of the transmitter. The interconnecting nodes of these resistor pairs provides the input to the local receiver. By selecting the values of these resistors pairs based on the transmitter resistors pair and the impedance of the transformer, the input to the receiver would not, with ideal components, include any portion of the locally transmitted signals. Thus being able to receive the signals being transmitted from remote transmitters without interference from the signals being transmitted by the local transmitter.

While this isolation circuit works well for low frequency applications (less than 10 KHz), at higher frequency applications such as ISDN and ADSL (Asymmetrical Digital Subscriber Line), the isolation circuit does not provide the needed attenuation. This degradation in attenuation results because the characteristic impedance of the transmission line changes with frequency, thus changing the impedance of the overall circuit. As the impedance of the circuit changes, the resistor pairs that provide the input to the local receiver are no longer proportional to the impedance of the transmitter resistors and the transformer, thus they allow a portion of the signals produced by the local transmitter to pass to the receiver. When this happens, the locally transmitted signals interfere with the remotely transmitted signals, resulting in loss of information.

Thus, there exists a need for a line isolation circuit that provides adequate isolation between a local transmitter and a local receiver over a wide range of frequency applications such that remotely transmitted information is not lost.

DETAILED DESCRIPTION OF THE DRAWINGS

The present invention describes a transmitter/receiver interface circuit for coupling a transmitter and a receiver to a bi-directional transmission path. Generally, the interface circuit minimally attenuates signals generated by the transmitter prior to coupling to the bi-directional transmission path, minimally attenuates signals received from the bi-directional transmission path and routed to the receiver, but significantly attenuates the signals generated by the transmitter from being received by the receiver, and does so over a wide range of frequency applications. Structurally, the interface circuit generally includes a transmit network and a receiver network that couple the transmitter and the receiver to the bi-directional transmission path, wherein components of the receiver network are selected based on the impedance of the transmit network and a transformer of the bi-directional transmission path. By selecting the components of the receiver network in this manner, the impedance of the receiver network can change proportionally to the change in the impedance of the transformer as the operating frequency of the signals vary over a wide frequency range. Thus, the receiver network provides the required attenuation of the signals between the local transmitter and the local receiver.

Figure 1:
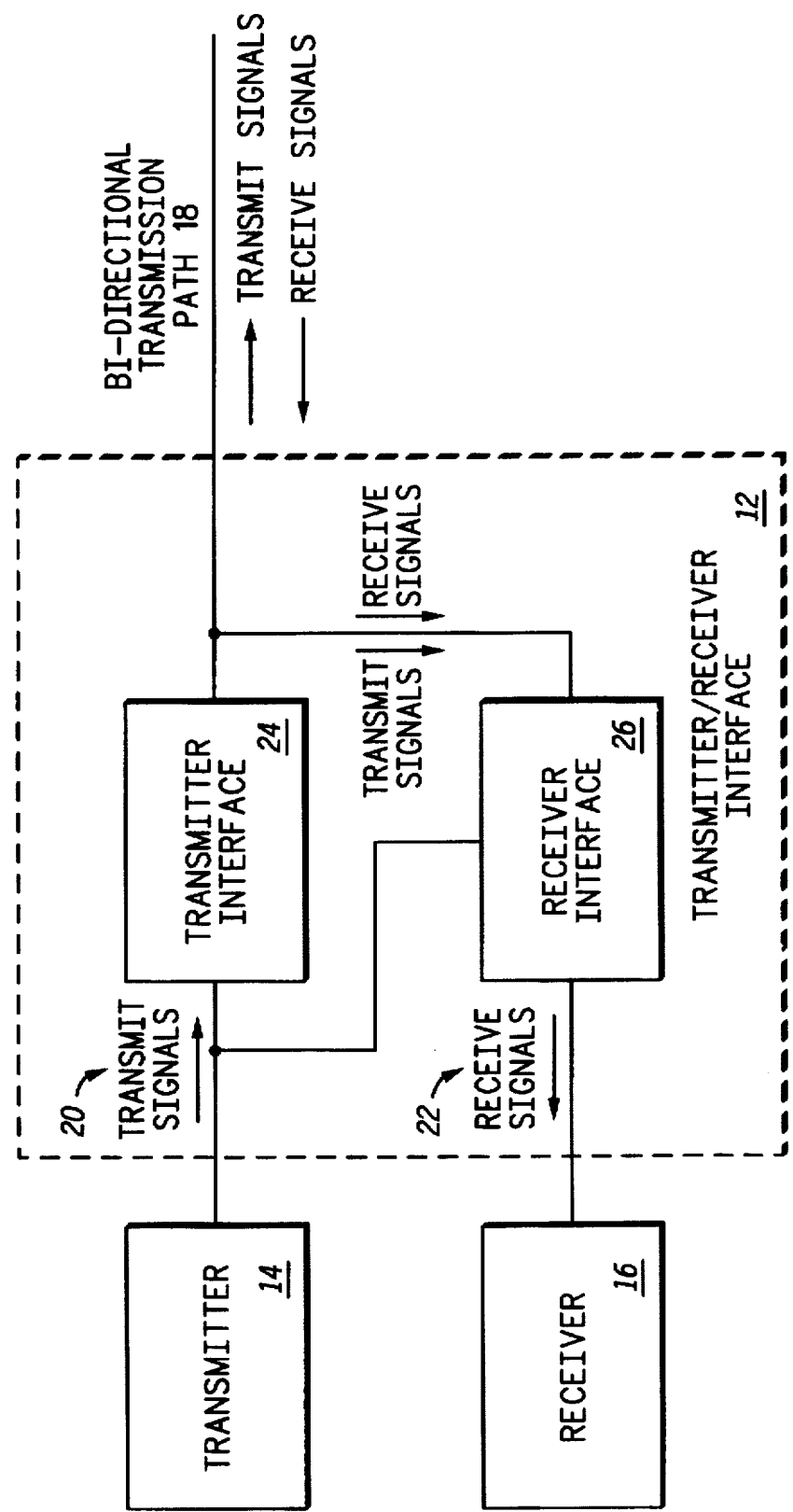
FIG. 1 illustrates a block diagram of a transmitter/receiver interface for a bi-directional transmission path incorporating the principles of the present invention.

FIG. 1 illustrates a line driver 10 comprising a transmitter/receiver interface 12, a transmitter 14, and a receiver 16 operably coupled to a bi-directional transmission path 18. The transmitter/receiver interface 12 comprises a transmitter interface 24 and a receiver interface 26. The transmitter interface 24 couples transmit signals 20, provided by the transmitter 14, to the bi-directional transmission path 18. The receiver interface 26 allows receive signals 22, which are remotely coupled onto the bi-directional transmission path 18 to pass with minimal attenuation to the receiver 16 while attenuating transmit signals 20 produced by the transmitter 14. The attenuation of the transmit signals 20 is accomplished by selecting an impedance of the receiver interface 26 to be a function of an impedance of the transmitter interface 24 and an impedance of the bi-directional transmission path 18 over a given frequency range (E.g. 10 KHz to 30 MHz).

In operation, the transmitter/receiver interface 12 serves to couple transmit signals 20 onto the bi-directional transmission path 18 with minimal attenuation, to couple receive signals 22 to the receiver 16 with minimal attenuation, and to significantly attenuate transmit signals 20 prior to their receipt by the receiver 16. The transmitter/receiver interface 12 accomplishes the above-described goals via selective circuit design and impedance selection techniques to provide a predetermined frequency response for a given frequency range. In practice, the components and topology of the transmitter/receiver interface 12 are selected by computer modeling such that a desired performance of the interface 12 is achieved. As one skilled in the art will readily appreciated, the teachings of the present invention may be practiced through the use of readily available electrical circuit modeling and design software programs.

In a typical application, the transmitter/receiver interface 12 locates at a first end of the bi-directional transmission path 18. Typical installations include video on demand systems, computer networking connections, telecommunications installations, and numerous other consumer and commercial applications in which the duplexing of signals is performed. As one skilled in the art will readily appreciate, the applications of the present invention are great. However, because particular applications are not readily germane to the function of the present invention, they will not be further described herein.

Figure 2:
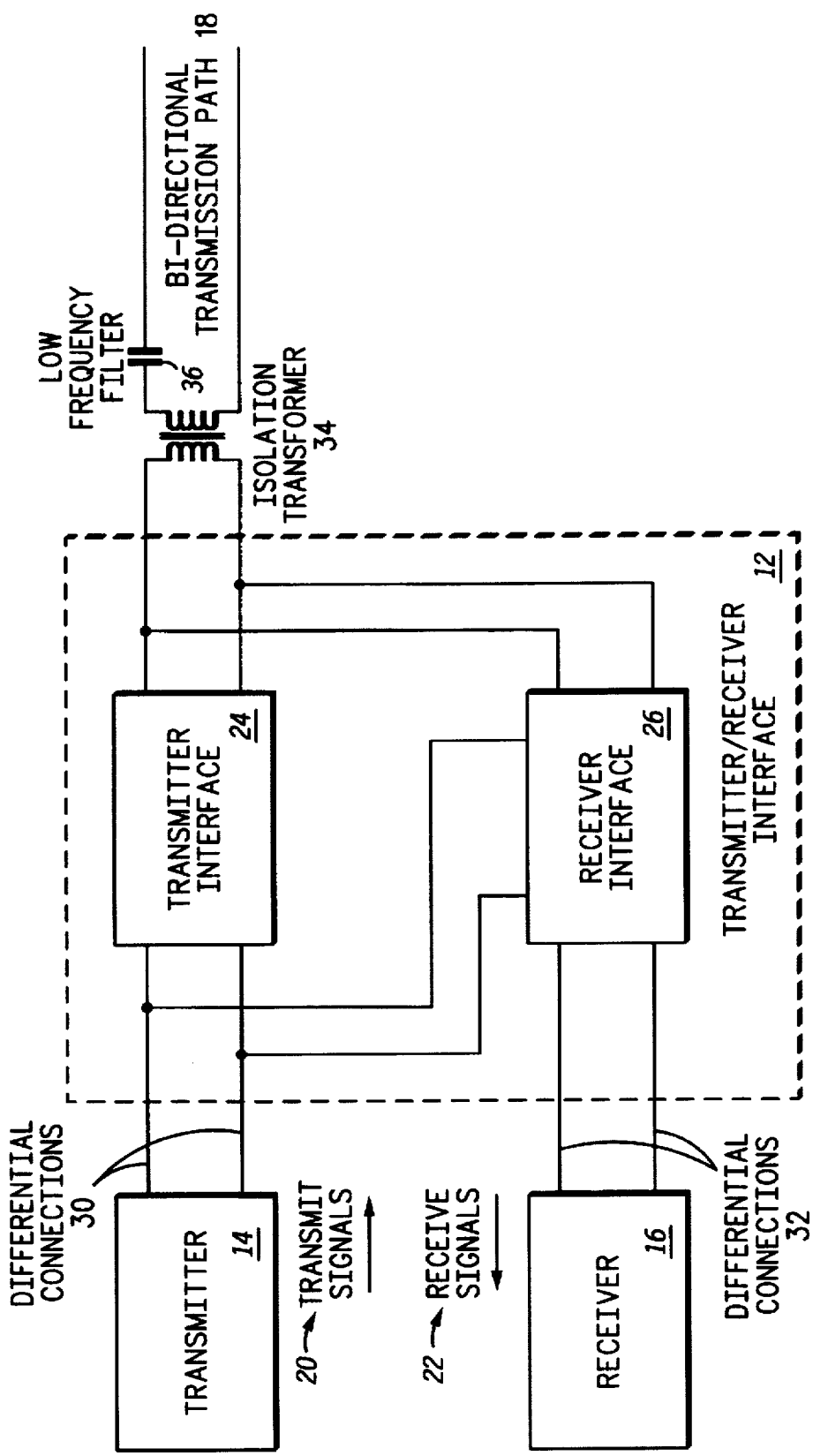
FIG. 2 illustrates a block diagram of a transmitter/receiver for use with a bi-directional transmission path, also incorporating the principles of the present invention.

FIG. 2 illustrates a differential line driver 29 that is similar to the line driver 10 of FIG. 1, but with differential connections. The line driver 29 includes the transmitter 14, which has differential connections 30, the receiver 16, which has differential connections 32, and the transmitter/receiver interface 12. The transmitter/receiver interface 12 includes a transmitter interface 24 that is operably connected to the transmitter 14 and a receiver interface 26 that is operably coupled to the receiver 16. The transmitter interface 24 and the receiver interface 26 are coupled to a first winding of an isolation transformer 34. A second winding of the isolation transformer 34 is coupled to a low frequency filter 36, which may be a capacitor, and subsequently connected to the bi-directional transmission path 18. Note that the bi-directional transmission path 18 may be any type of communication medium, such as coaxial cable, twisted copper pair, fiber optical, radio frequency, and the transmission path 18 may use any type of transmission technique, such as ISDN ( ), ADSL (Asymmetrical Digital Subscriber Line), frequency modulation.

The isolation transformer 34 will be constructed based on the particular type of transmission technique being used. For example, if the transmission technique is ISDN, the transformer 34 would need to operate at frequencies of 100 KHz to 200 KHz, while if the transmission technique is ADSL, the transformer 34 would need to operate at frequencies from 25 KHz to 1.1 MHz. Selection of the low frequency filter 36, which preferably comprises a series capacitor, is also dependent on the transmission technique being employed. While a capacitor is a preferred choice for the low frequency (high pass) filter 36, one skilled in the art will readily appreciate that the low frequency filter 36 could comprise differing elements and connection topologies.

Figure 3:
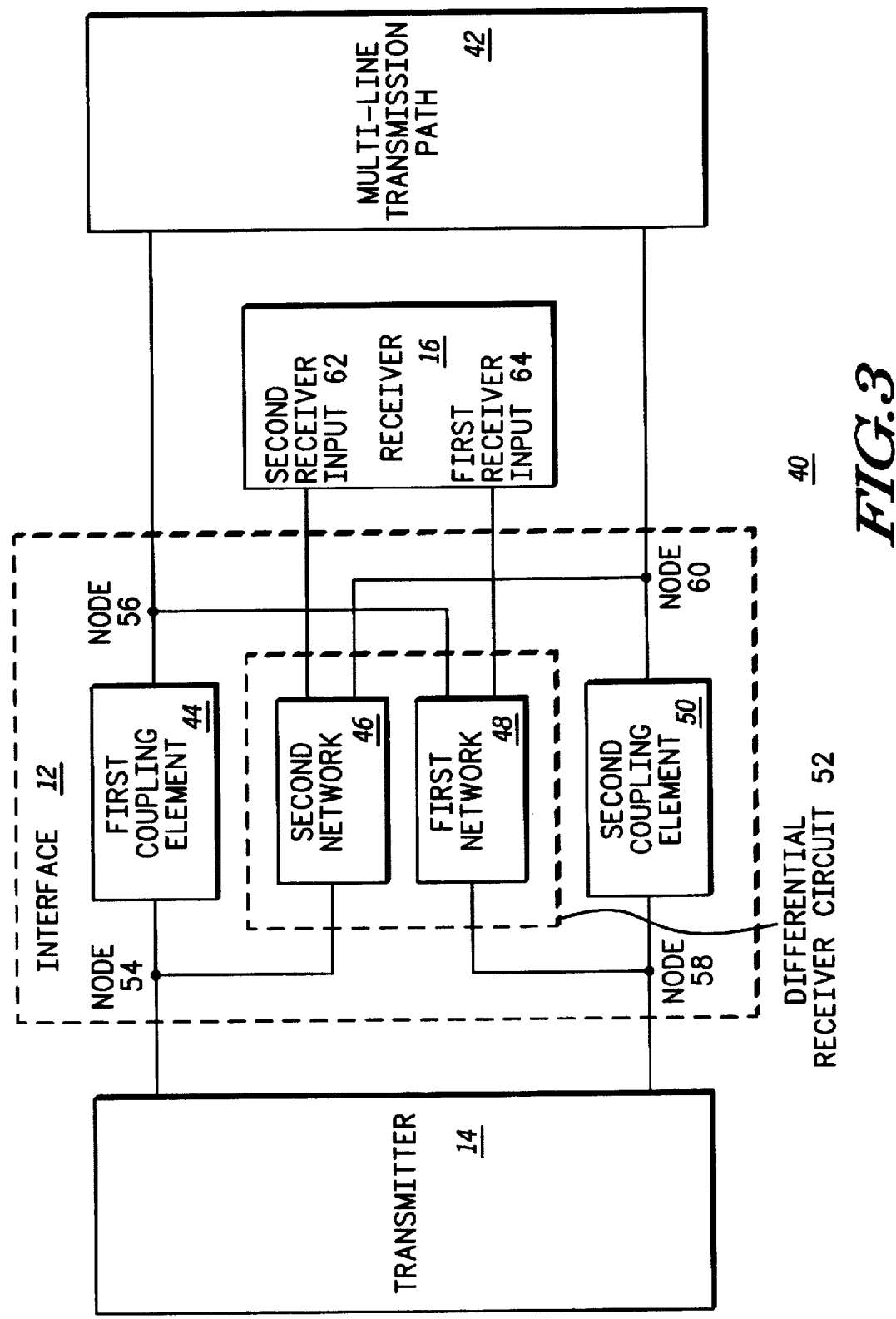
FIG. 3 illustrates a block diagram of an interface circuit for use with a multi-line transmission path incorporating the principles of the present invention.

FIG. 3 illustrates another line driver circuit 40 for use with a multi-line transmission path 42, or bi-directional transmission path. The line driver circuit 40 includes the transmitter 14, the receiver 16 coupled to the multi-line transmission path 42 via the interface 12. The interface 12 comprises a first coupling element 44, a second coupling element 50, and a differential receive circuit 52. The first coupling element operably couples a first node 54 of the transmitter 14 to a first node 56 of a first line of the multi-line transmission path 42. The second coupling element 50 operably couples a second node 58 of the transmitter 14 to a second node 60 of a second line of the multi-line transmission path 42.

The differential receive circuit 52 operably couples to the first coupling element 44, the second coupling element 50, the first node 56 of the first line of the multi-line transmission path 42, and to the second node 60 of the second line of the multi-line transmission path 42. The differential receive circuit 52 comprises a first network 48 and a second network 46. The first network 48 couples between the second node 58, the first node 56 of the first line of the multi-line transmission path 42, and the first receiver input 64. The second network 46 couples between a first node 54, a second line of the multi-line transmission path 42 at a second node 60, and the a second receiver input 62. The transfer characteristics of the first network 48 are based on an impedance of the multi-line transmission path 42 and an impedance of the second coupling element 50 to provide desired attenuation and transfer characteristics. The transfer characteristics of the first network 48 and the second network 46 are based on an impedance of the multi-line transmission path 42 and an impedance of the first coupling element 44 to provide desired attenuation and transfer characteristics.

In operation, the line driver circuit 40 provides isolation between the transmitter 14 and the receiver 16 for signals transmitted by the transmitter 14. Simultaneously, the interface circuit 40 allows signals provided by the multi-line transmission path 42 at nodes 56 and 60 to propagate through the differential receive circuit 52 and be received by receiver 16 at the first receiver input 64 and the second receiver input 62. Finally, the interface circuit 40 allows signals generated by the transmitter 14 to propagate onto the multi-line transmission path with minimal attenuation.

Figure 4:
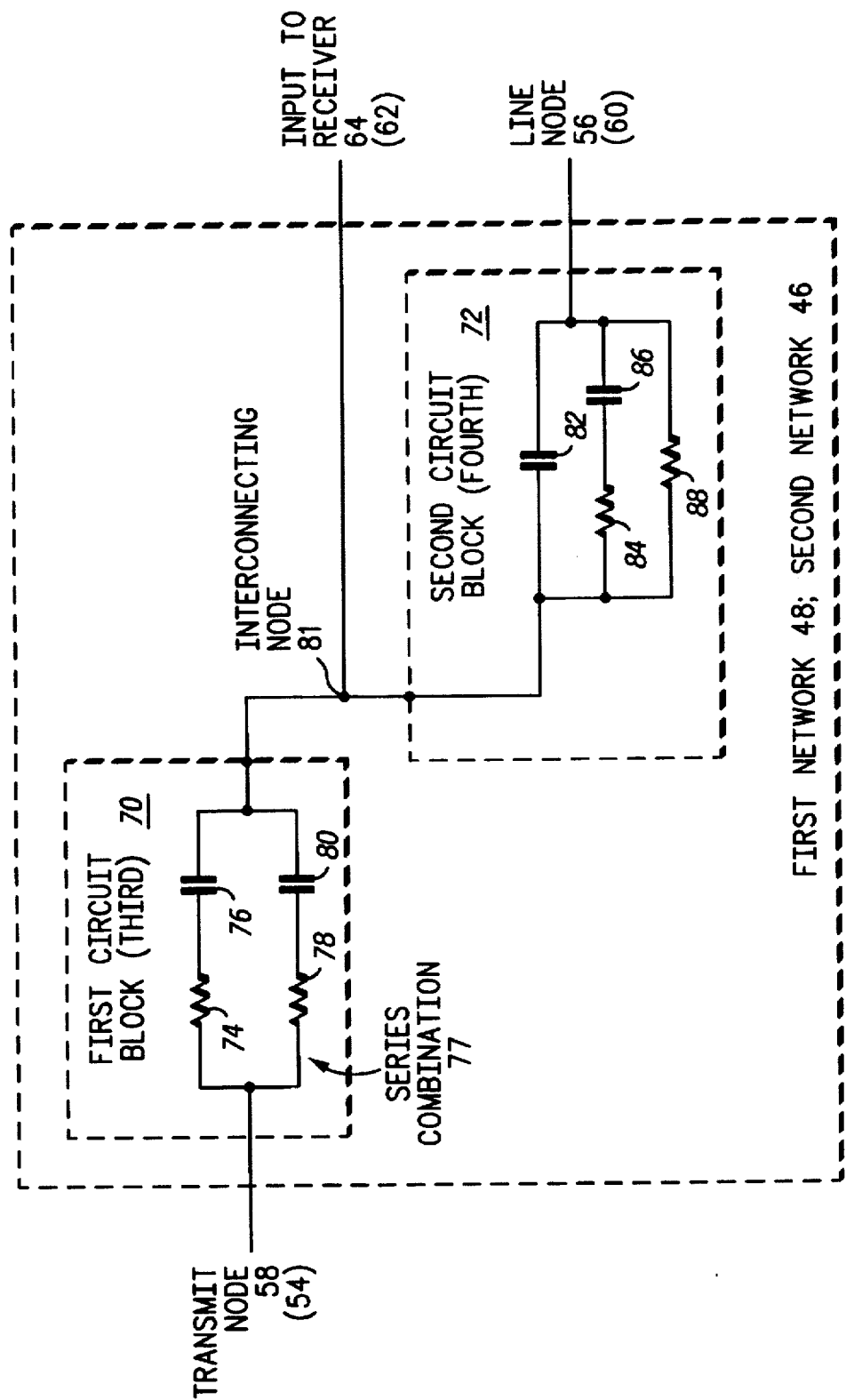
FIG. 4 illustrates a block diagram derailing a first network of the interface circuit illustrated in FIG. 3.

FIG. 4 details the first network 48 and/or the second network 46 of FIG. 3. For the purposes of this discussion, only the first network will be discussed, however, FIG. 4 also includes, in parentheticals, corresponding reference number for the second network 46. The first network 48 comprises a first circuit block 70 serially coupled to a second circuit block 72. The first circuit block 70 end of the series connection couples to the second node 58 of transmitter 14 while the second circuit block 72 end of the series connection the line node 56 of the second line of the multi-line transmission path 42. The interconnection of the first and second circuit blocks 70, 72 occur at interconnecting node 81 which serves as the first input 64 to the receiver 16.

The first circuit block 70 includes at least one resistor and at least one capacitor. More particularly, the first circuit block 70 comprises a parallel combination of a first series connection (first leg) 77 and a second series connection (second leg), wherein the first leg comprises a first resistor 74 in series with a first capacitor 76 and the second leg comprises a second resistor 78 in series with a second capacitor 80. The number of components in the first circuit block 70 will depend on the operating frequency of the signals being transmitted. For example, the characteristic impedance of the transformer and the transmission path at lower frequencies (where lower frequencies are relative to the transmission technique being employed, thus for ISDN 20 KHz would be considered low) resembles the low frequency filter (i.e., the capacitor), primary inductance, and a resistive load. Thus, to produce a proportional impedance for this example, the first circuit block 70 would only need a resistor and two capacitors which are derivived based the impedance of the transformer and the transmission path. As the frequency increases, the leakage inductance of the transformer and the capacitance of the transmission path become factors. As these additional factors are introduced, the first circuit block 70 becomes more complex to account for these additional factors.

The second circuit block 72 includes a network designed to compensate for impedance variations of the transmission line over frequency. For lower frequency applications, the second circuit block 72 would include only a resistor 88 and a parallel capacitor 82. As the operating frequency increases, additional components may be added to the second circuit block 72. For example, a series combination of a capacitor 86 and a resistor 84 coupled in parallel to the resistor 88 provides additional impedance compensation commensurate with impedances changes of the line. As with the first circuit block 70, the elements of the second circuit block 72 are selected based on the impedance of the transmission line and the transmitter coupling elements 44, 50, which are typically resistors.

In practice, selection of the first and second circuit block components will be done to minimize the current draw of the receiver circuit 52. In other words, the impedance of the first and second circuit block components are selected such that the receiver network draws substantially (at least a factor of 10) less current that the current being supplied by the transmitter. Additionally, selection of these components may be most easily accomplished by the modeling of the circuit on a digital computer and solving for an optimal result. As one of ordinary skill in the art will readily appreciate, the elements comprising the first and second circuit blocks 70, 72 may be configured, selected, and computer modeled using various available circuit modeling programs.

Figure 5:
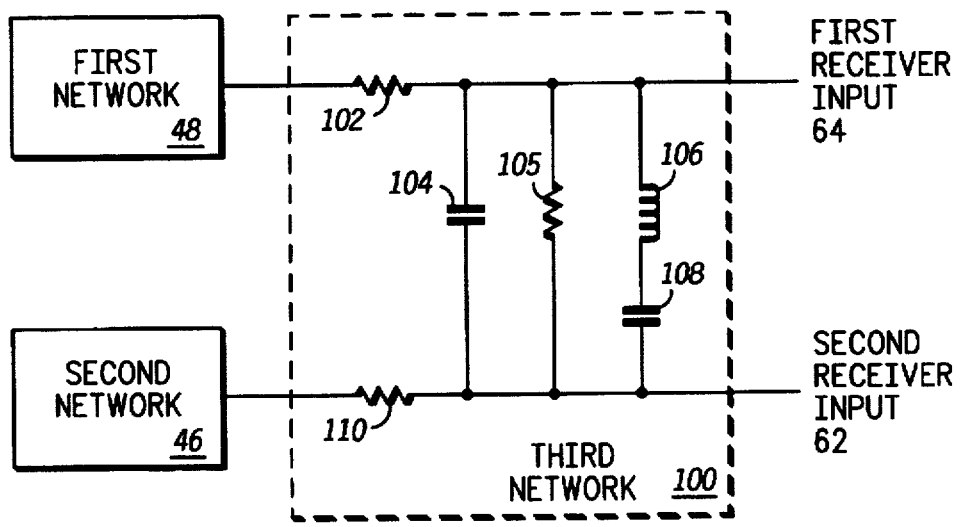
FIG. 5 illustrates a block diagram detailing a third network incorporated into the interface circuit of FIG. 3.

FIG. 5 details a third network added to the interface circuit of FIG. 3. The third network 100 operably couples between the first network 48 and the second network 46 and serves to process or filter the signal produced across the first network 48 and the second network 46. Depending on the filtering requirements, the third network 100 may include a capacitor 104 and a resistor 105. As the filtering requirements vary, the third network 100 may further include an inductor 106, a capacitor 108, and resistors 102, 110. The elements of the third network 100 operably connect so as to provide a desired transfer characteristics of the third network 100 and, as one skilled in the art will readily appreciate, may be optimized by computer modeling. Note that in one application, the third network 100 serves to attenuate received signals 22 having a magnitude exceeding the operational range of the receiver 16.

Figure 6:
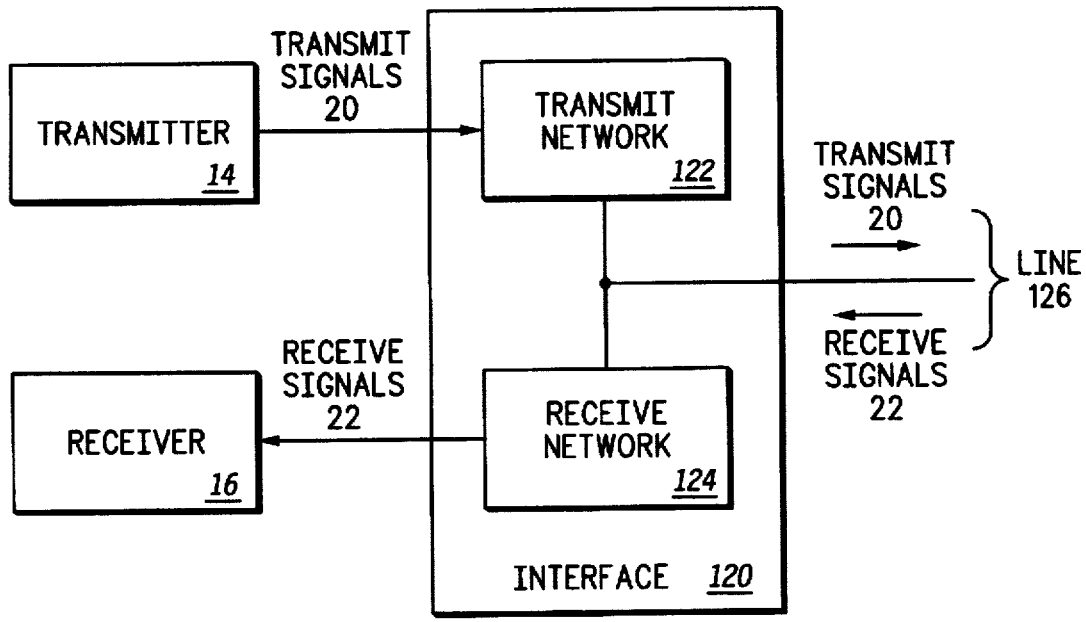
FIG. 6 illustrates a block diagram of a line driver circuit incorporating the principles of the present invention.

FIG. 6 illustrates another line driver circuit 118 which includes a transmitter 14, a receiver 16, and an interface 120. The transmitter 14 provides a transmit signal 20 to the line 126 through the interface 120. The receiver 16 receives a signal 22 from the line 126 through the interface 120. The interface 120 serves to couple the transmitter 14 to the line 126 and also to couple the receiver 16 to the line 126. The interface 120 includes a transmit network 122 and receive network 124. The transmit network 122 provides coupling between the transmitter 14 and the line 126 with minimal attenuation. The receiver network 124 provides coupling between the receiver 16 and the line 126 with minimal attenuation.

In combination, the transmit network 122 and the receive network 124 provide significant attenuation between the transmitter 14 and receiver 16. Resultantly, the current draw of the receiver network 124 is substantially less than the current supplied by the transmitter 14. The current flow through the receive network 124 is a result of the reflection created by elements in both the transmit network 122 and the receive network 124, as well as an impedance of the line 126. As a whole, the design and components of the interface 120 are chosen so as to achieve the desired attenuation and coupling goals as previously discussed.

Figure 7:
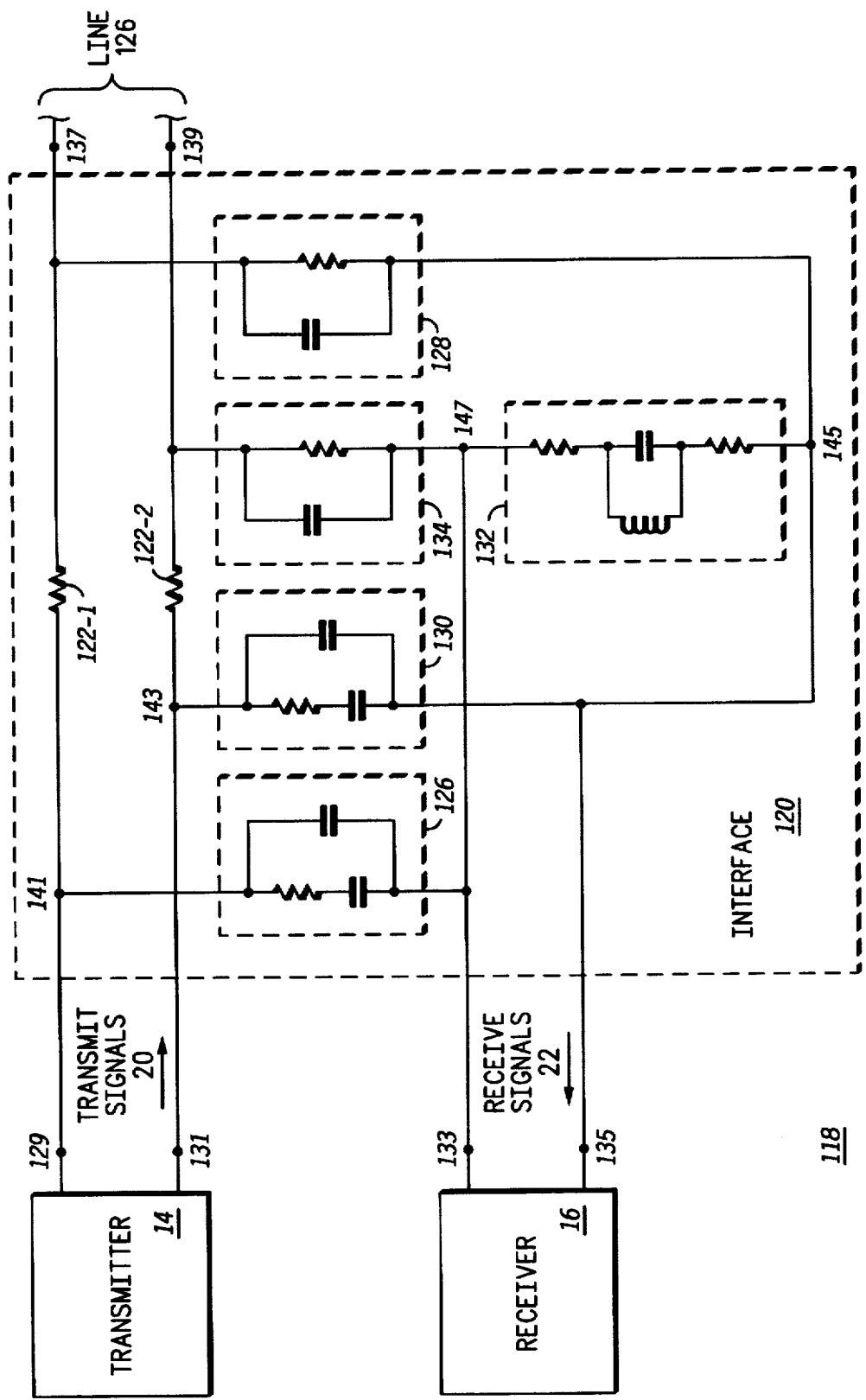
FIG. 7 illustrates a block diagram of a differential line driver circuit incorporating the principles of the present invention.

FIG. 7 illustrates a line driver circuit 118 in greater detail. The line driver circuit 118 comprises a transmitter 14, a receiver 16, and an interface 120 that includes a transmit network 122 and a receive network 124. The transmitter 14 provides transmit signals 20 to the interface 120 while the receiver 16 receives signals 22 from the interface 120. The transmit network 122 includes a first coupling element 122-1 and a second coupling element 122-2. The first coupling element 122-1 operably couples a first node 129 of the transmitter 14 to a first connection 137 and a line 126. The second coupling element 122-2 operably couples a second node of the transmitter 131 to a second connection 139 of the line 126. Preferably, both the first coupling element 122-1 and the second coupling element 122-2 comprise series resistors selected such that the input impedance of the interface 120 as seen by the line 126 equals the characteristic impedance of the line 126. In this fashion, receive signals 122 are not reflected at the first connection 137 and the second connection 139 of the line 126.

The receive network 124 comprises a first network coupled between the first connection 137 of the line and the second coupling element 122-2. Preferably, the first network comprises a first circuit block 128 serially connected to a second circuit block 130, wherein the interconnecting node 145 serves as an input 135 to the receiver 16. The first circuit block 128 comprises at least one resistor and at least one capacitor, while the second circuit block 130 comprises at least one resistor and at least one capacitor. Alternatively, the first circuit block 128 includes a resistor in parallel with a capacitor while the second circuit block 130 includes the parallel combination of a resistor and a resistor in series with a capacitor. As previously discussed, the transfer characteristics of the first network are based on an impedance of the multi-line transmission path, the line and the second coupling element 122-2.

The second network operably couples between a second connection 139 of the line 126 and the first coupling element 122-1. The second network preferably comprises a first circuit block 126 connected in series with a second circuit block 134, wherein the interconnecting node 147 serves as an input 133 to the receiver 16. The first circuit block 126 comprises at least one resistor and at least one capacitor, while the second circuit block 134 comprises at least one resistor and at least one capacitor. Alternately, the first circuit block 126 comprises the parallel combination of a capacitor and a resistor in series with another capacitor while the second circuit block 134 comprises the parallel combination of a resistor and a capacitor. Similar to the first network, the transfer characteristics of the second network are based on the impedance of the line 126 and the impedance of the first coupling element 122-2.

The line driver circuit 118 of FIG. 7 also includes a third network 132 operably coupled between the node 145 of the first network and the node 147 of the second network. As previously described, the third network may serve to attenuate the magnitude of receive signals 22 to achieve performance in a given system. The third network preferably comprise at least one resistor, at least one capacitor, and at least one inductor. While the illustration of FIG. 7 shows that the first node 145 and the second node 147 reside external to the third network 132, the receiver 16 could be coupled to the third network in varying fashions so as to achieve the desired result.

Figure 8:
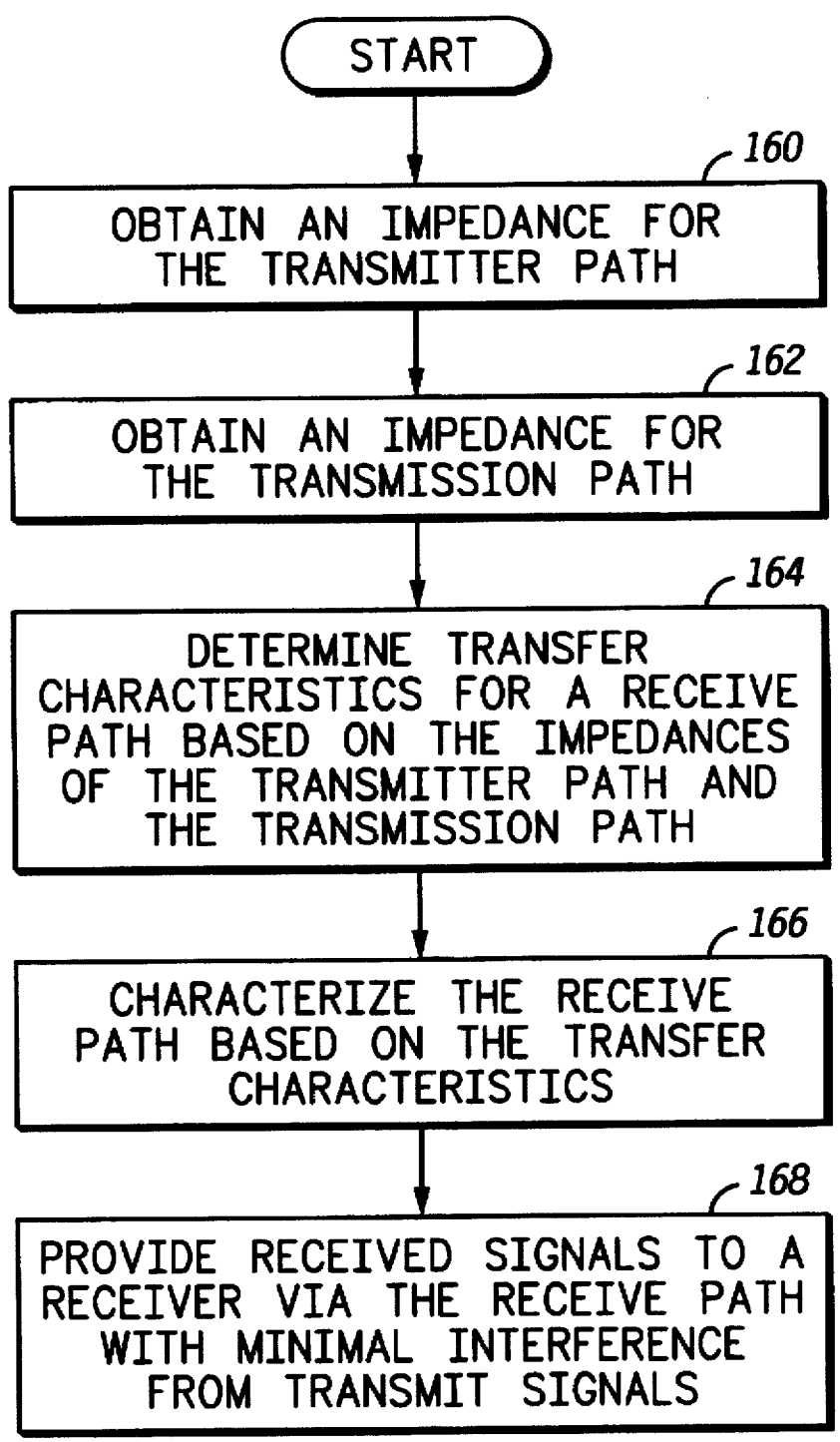
FIG. 8 illustrates a block diagram of a method in accordance with the present invention.

FIG. 8 illustrates a method for transmitting and receiving signals on a transmission path incorporating the teachings of the present invention. This method is intended to at least be partially implemented in software and run on a digital computer, microprocessor, digital signal processor, or any other type of processing device that executes operations based on a series of instructions. However, it would also be possible to implement the method of the present invention in a hardware implementation as well.

The method of the present invention starts at step 160, wherein an impedance of a transmitter path is attained. At step 162, an impedance for a transmission path is attained. At step 164, the method includes determining the transfer characteristics for a receive path based on the impedances of the transmitter path and the transmission path. The receive path is characterized based on the transfer characteristics previously generated. Finally, at step 168, the method includes providing receive signals to a receiver via the receive path with minimal interference from transmit signals. Consistent with the teachings of the present invention, the method may be used to selectively pass and attenuate signals on a transmission path. In a typical implementation, a designer would know the impedance of the transmission path either by calculative or empirical steps. The designer would also determine the impedance of the transmitter path. Armed with such knowledge, the designer would use a digital computer program to design an optimal topology and select the values for elements in the topology. Based on this solution, the designer could build the circuit and implement its use.

The present invention provides a method and apparatus for improving attenuation of locally transmitted signals over a wide frequency range. By proportionally matching impedances of a receiver network with impedances of a transmit network and a transmission path, loss information, which the described prior art circuits were subject to, is eliminated. Additionally, the impedances of the receiver network may be scaled such that the receiver network sinks considerably less current than the transmitter provides.

The above described preferred embodiments are intended to illustrate the principles of the invention, but not to limit the scope of the invention. Various other embodiments and modifications to these preferred embodiments may be made by those skilled in the an without departing from the scope of the following claims.

I claim:

1. An interface circuit for a multi-line transmission path comprising:

a first coupling element that operably couples a first node of a transmitter to a first line of the multi-line transmission path;

a second coupling element that operably couples a second node of the transmitter to a second line of the multi-line transmission path;

a differential receive circuit operably coupled to the first coupling element, the second coupling element, the first line, and the second line, wherein the differential receive circuit includes:

a first network operably coupled to the first line and the second coupling element, wherein a node of the first network provides a first input to a receiver, and wherein transfer characteristics of the first network are based on impedance of the multi-line transmission path and the second coupling element, the first network comprising a first circuit block and a second circuit block, and wherein the node of the first network resides at an interconnection of the first circuit block and the second circuit block, the first circuit block comprises at least a first resistor and at least a first capacitor, and the second circuit block comprising at least a second resistor and at least a second capacitor; and a second network operably coupled to the second line and the first coupling element, wherein a node of the second network provides a second input to the receiver, and wherein transfer characteristics of the second network are based on impedance of the multi-line transmission path and the first coupling element.

2. The interface circuit of claim 1 wherein:

the first circuit block comprises a parallel combination of a first series combination and a second series combination, wherein the first series combination includes the first resistor in series with the first capacitor and the second series combination includes a third resistor in series with a third capacitor; and the second circuit block comprises a parallel combination of a third series combination, a fourth capacitor, and a fourth resistor, wherein the third series combination includes the second resistor in series with the second capacitor.

3. The interface circuit of claim 1 wherein the second network comprises a third circuit block and a fourth circuit block, and wherein the node of the second network resides at an interconnection of the third circuit block and the fourth circuit block.

4. The interface circuit of claim 3 wherein:

the third circuit block comprises at least a fifth resistor and at least fifth capacitor; and the fourth circuit block comprises at least a sixth resistor and at least a sixth capacitor.

5. The interface circuit of claim 1 wherein:

the first circuit block comprises a parallel combination of a first leg and a second leg, wherein the first leg comprises the first resistor in series with the first capacitor and the second leg comprises a third capacitor; and the second circuit block comprises the second capacitor in parallel with the second resistor.

6. The interface circuit of claim 1 further comprising a third network operably coupled to the node of the first network and the node of the second network.

7. The interface circuit of claim 6 wherein the third network further comprises a third input to the receiver and a fourth input to the receiver.

8. The interface circuit of claim 6 wherein the third network comprises at least a third resistor and at least a third capacitor.

9. The interface circuit of claim 8 wherein the third network further comprises at least an inductor.

10. A line driver circuit comprising:

a transmitter that provides a transmit signal to a transmission line;

a receiver that receives a receive signal from the transmission line;

an interface that couples the transmitter to the transmission line and couples the receiver to the transmission line, wherein the interface includes:

a transmit network that provides coupling between the transmitter and the transmission line, the transmit network having a first coupling element that operably couples a first node of the transmitter to a first connection of the transmission line, and a second coupling element that operably couples a second node of the transmitter to a second connection of the line; and a receiver network that provides coupling between the receiver and the transmission line, wherein current draw of the receiver network is substantially less than current supplied by the transmitter, wherein impedance of the receiver network is based on impedance of the transmission line and impedance of the transmit network, and wherein the receiver network attenuates the transmit signal and substantially passes the receive signal, the receiver network having a first network operably coupled to the first connection of the transmission line and the second coupling element, wherein a node of the first network provides a first input to the receiver, and wherein transfer characteristic of the first network are based on an impedance of the transmission line and the second coupling element, the first network having a first circuit block and a second circuit block, the first circuit block having at least a first resistor and at least a first capacitor, the second circuit block having at least a second resistor and at least a second capacitor, wherein the node of the first network resides at an interconnection of the first circuit block and the second circuit block, and a second network operably coupled to the second connection of the transmission line and the first coupling element, wherein a node of the second network provides a second input to the receiver, and wherein transfer characteristics of the second network are based on an impedance of the transmission line and the first coupling element.

11. The line driver circuit of claim 10 wherein:

the first circuit block comprises a parallel combination of a first leg and a second leg, wherein the first leg comprises the first resistor in series with the first capacitor and the second leg comprise a third resistor in series with a third capacitor; and the second circuit block comprises a parallel combination of a fourth leg, a fifth leg, and a sixth leg, wherein the fourth leg comprises the second capacitor, the fifth leg comprises the second resistor, and the sixth leg comprises a fourth resistor in series with a fourth capacitor.

12. The line driver circuit of claim 10 wherein:

the first circuit block comprises a parallel combination of a first leg and a second leg, wherein the first leg comprises the first resistor in series with the first capacitor and the second leg comprises a third capacitor; and the second circuit block comprises the second capacitor in parallel with the second resistor.

13. The line driver circuit of claim 10 wherein the second network comprises a third circuit block and a fourth circuit block, and wherein the node of the second network resides at an interconnection of the third circuit block and the fourth circuit block.

14. The line driver circuit of claim 13 wherein:

the third circuit block comprises at least a third resistor and at least a third capacitor; and the fourth circuit block comprises at least a fourth resistor and at least a fourth capacitor.

15. The line driver circuit of claim 10 further comprising a third network operably coupled between a node of the first network and a node of the second network.

16. The line driver circuit of claim 15 wherein the third network further comprises a third input to the receiver and a fourth input to the receiver.

17. The line driver circuit of claim 15 wherein the third network comprises at least one resistor and at least one capacitor.

18. The line driver circuit of claim 17 wherein the third network further comprises at least an inductor.

* * * * *